UNITED STATES PATENT OFFICE.

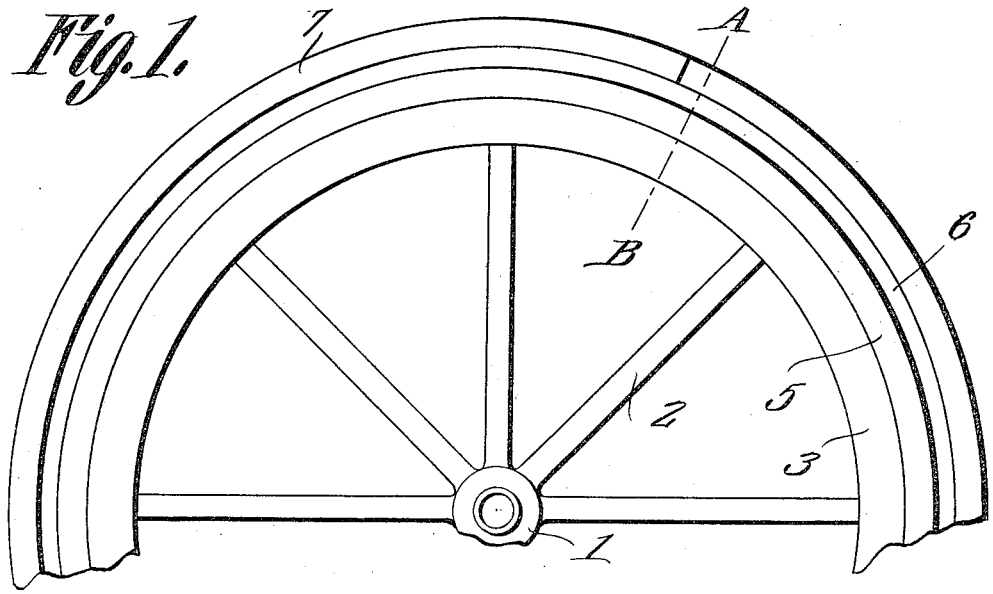
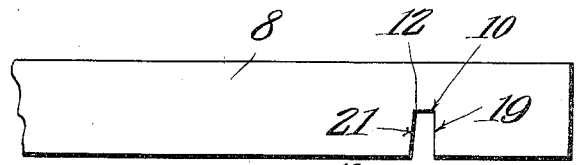
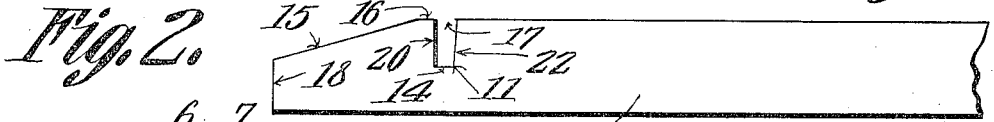
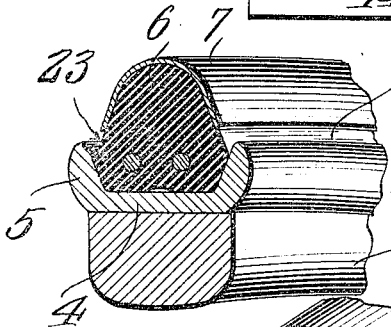
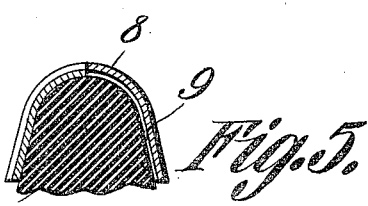
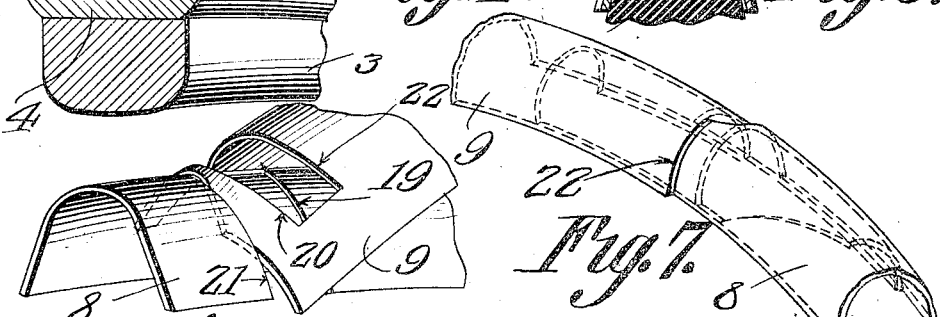

JOSEPH A. UTTER, OF CRAWFORDSVILLE, INDIANA, ASSIGNOR OF ONE-HALF TO JOHN F. UTTER, OF SAN FRANCISCO, CALIFORNIA.

RUBBER-TIRE PROTECTOR.

1,046,686.

Specification of Letters Patent.  Patented Dec. 10, 1912.

Application filed December 28, 1911. Serial No. 668,237.

*To all whom it may concern:*

Be it known that I, JOSEPH A. UTTER, a citizen of the United States, residing at Crawfordsville, in the county of Montgomery and State of Indiana, have invented a new and useful Rubber-Tire Protector, of which the following is a specification.

This invention aims to provide a metal protector for a vehicle tire, adapted to prevent injury to the tire, through engagement with the roadway, the protector being adapted to lessen the jar, to act noiselessly, and to permit some resilient action to the tire which the protector partially covers.

A further object of the invention is to provide novel means for assembling the ends of the trough-shaped tire protector.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 is a fragmental side elevation of a wheel equipped with the protector of my invention; Fig. 2 is a top plan of one of the meeting ends of the protector; Fig. 3 is a top plan of the other end of the protector; Fig. 4 is a sectional perspective of the wheel rim equipped with the protector of my invention; Fig. 5 is a transverse section upon the line A—B of Fig. 1; and Figs. 6 and 7 are fragmental perspectives of the adjacent ends of the protector, the views being adapted to illustrate successive steps in the operation of assembling the ends of the protector.

Passing briefly over those portions of the disclosure which are of minor importance, the numeral 1 indicates the hub of a vehicle wheel, the numeral 2 indicating the spokes. A felly is shown at 3, the felly 3 supporting a rim 4, having outstanding flanges 5, between which is located the tire 6. The tire 6 may be of any desired construction.

The invention includes a trough-shaped, annular protector, denoted generally by the numeral 7, and adapted to extend around the tire 6, circumferentially of the same. The protector 7 is preferably, although not necessarily, fashioned from steel, and is resilient. Noting the places at which the numerals 23 are applied in Fig. 4, it will be observed that the edges of the protector 7 are spaced from the edges of the flanges 5. Owing to this construction, the tire 6 will be permitted to yield, without bringing the edges of the protector into engagement with the flanges. The resiliency of the tire 6, therefore, will be impaired to a relatively small degree only.

The tire protector 7, although of annular form, is transversely divided to define the ends 8 and 9. In the opposite lateral edges of the ends 8 and 9, there are notches 10 and 11, respectively. The bases 12 and 14 of the respective notches 10 and 11 are located in the median plane of the protector 7. As denoted by the numeral 15, one of the lateral edges of the end 9 is beveled from a point 16 adjacent the mouth 17 of the notch 11 to the free extremity 18 of the end 9. The contacting edges 19 and 20 of the notches 10 and 11 are disposed at right angles to the median plane of the protector. The other edges 21 and 22 of the notches 10 and 11 slant slightly with respect to the median plane of the tire, so that the notches 10 and 11 are somewhat wider at their mouths than adjacent their bases 12 and 14; although this flaring construction of the notches 10 and 11 is optional.

In assembling the ends 8 and 9, the free extremity 18 of the end 9 is thrust into the notch 10, the beveled edge 15 of the end 9 ordinarily riding in the angle defined by the side 21 and the base 12 of the notch 10; as shown in Fig. 6. Ultimately, the notches come into engagement, as shown in Fig. 7, and finally the edges 19 and 20 will engage at the angles defined by the base 12 and the edge 19 upon the one hand, and the base 14 and the edge 22 on the other hand.

It will be observed that when the ends 8 and 9 are thus assembled, the extremity of the portion 9 will be housed beneath the portion 8, the extremity of the portion 8 being housed beneath the portion 9. The width of the notches 10 and 11 is such that the ends 8 and 9 may have a slight reciprocating motion upon each other, circumferentially of the tire. Owing to this construction, the resiliency of the tire will be interfered with to a relatively small degree.

It has been stated hereinbefore that the edges 19 and 20, which are ordinarily in contact, or likely to come into contact, are disposed at right angles to the median plane of the tire. Therefore, when the wheel rolls along the ground, the ends 8 and 9 will not tend to separate transversely. This advantageous feature results from the fact that when the wheel rolls along the ground, the thrust upon the tire, circumferentially of the wheel, will have no transverse component along the edges 19 and 20, since a force can have no component at right angles to its direction.

Generally considered, a tire equipped with the protector herein disclosed, will last much longer than an unprotected tire, the resilient metal sheet or protector 7 serving to maintain the tire out of engagement with the roadway, and therefore preserving the tire from injury.

Having thus described the invention, what is claimed is:—

1. An annular, trough-shaped tire protector having interengaging notches in its opposite edges adjacent its ends, the bases of the notches being located in the median line of the protector.

2. An annular, trough-shaped tire protector having interengaging notches in its opposite edges adjacent its ends, one end of the protector being beveled upon one of its lateral edges from a point adjacent the mouth of the notch in said end to the free extremity of said end.

3. An annular, trough-shaped tire protector having interengaging notches in its opposite edges adjacent its ends, the bases of the notches being located in the median line of the protector, one end of the protector being beveled upon one of its lateral edges from a point adjacent the mouth of the notch in said end to the free extremity of said end.

4. An annular, trough-shaped tire protector having interengaging notches in its opposite edges adjacent its ends, the bases of the notches being located in the median line of the protector, the contacting edges of the notches being at right angles to the median plane of the protector.

5. An annular, trough-shaped tire protector having interengaging notches in its opposite edges adjacent its ends, one end of the protector being beveled upon one of its lateral edges from a point adjacent the mouth of the notch in said end to the full extremity of said end, the contacting edges of the notches being located at right angles to the median plane of the protector.

6. An annular, trough-shaped tire protector having interengaging notches in its opposite edges adjacent its ends, the bases of the notches being located in the median plane of the protector, one end of the protector being beveled upon one of its lateral edges from a point adjacent the mouth of the notch in said end to the free extremity of said end, the contacting edges of the notches being located at right angles with respect to the median plane of the protector.

In testimony that I claim the foregoing as my own, I have hereto affixed my signature in the presence of two witnesses.

JOSEPH A. UTTER.

Witnesses:
 LEWELLYN J. COPPAGE,
 MABEL HAMILTON.